US011529979B2

(12) United States Patent
Brand et al.

(10) Patent No.: US 11,529,979 B2
(45) Date of Patent: Dec. 20, 2022

(54) SYSTEMS AND METHODS FOR ADJUSTING TRAIN OPERATION

(71) Applicant: Progress Rail Services Corporation, Albertville, AL (US)

(72) Inventors: John W. Brand, Flower Mound, TX (US); Bradley Howard, Argyle, TX (US); Marc Miller, Lee's Summit, MO (US); Gabriel G. Abreo, Grain Valley, MO (US)

(73) Assignee: Progress Rail Services Corporation, Albertville, AL (US)

( * ) Notice: Subject to any disclaimer, the term of this patent is extended or adjusted under 35 U.S.C. 154(b) by 470 days.

(21) Appl. No.: 16/814,244

(22) Filed: Mar. 10, 2020

(65) Prior Publication Data

US 2021/0284210 A1  Sep. 16, 2021

(51) Int. Cl.
*B61L 23/02* (2006.01)
*G01M 3/38* (2006.01)
*B61L 27/04* (2006.01)

(52) U.S. Cl.
CPC .............. *B61L 23/02* (2013.01); *B61L 27/04* (2013.01); *G01M 3/38* (2013.01); *B61L 2201/00* (2013.01)

(58) Field of Classification Search
CPC ...... B61L 23/02; B61L 27/04; B61L 2201/00; B61L 3/006; B61L 15/0081; G01M 3/38; G01M 3/002
See application file for complete search history.

(56) References Cited

U.S. PATENT DOCUMENTS

| 3,767,146 | A  | * | 10/1973 | Gallagher | B61K 9/06 246/169 D |
| 5,730,526 | A  | * | 3/1998  | Davis     | G01L 5/28 374/45 |
| 8,140,250 | B2 |   | 3/2012  | Mian et al. | |
| 8,335,606 | B2 | * | 12/2012 | Mian      | G01N 21/88 701/19 |
| 8,649,932 | B2 | * | 2/2014  | Mian      | G06V 10/44 348/148 |
| 9,669,818 | B2 | * | 6/2017  | Kull      | G01L 5/28 |
| 9,987,752 | B2 |   | 6/2018  | Fisher et al. | |
| 2013/0278771 | A1 | * | 10/2013 | Magoun | H04N 5/33 348/148 |
| 2013/0313433 | A1 | * | 11/2013 | Mian   | B61K 9/06 250/338.4 |
| 2016/0318497 | A1 | * | 11/2016 | Wright | B60T 17/228 |
| 2018/0231364 | A1 | * | 8/2018  | Mian   | G01B 11/06 |
| 2018/0341859 | A1 |   | 11/2018 | Araujo et al. | |
| 2019/0003919 | A1 |   | 1/2019  | Asano et al. | |

FOREIGN PATENT DOCUMENTS

CN    103472344 A    12/2013

\* cited by examiner

*Primary Examiner* — Tung S Lau
(74) *Attorney, Agent, or Firm* — Bookoff McAndrews PLLC

(57) ABSTRACT

Systems and methods for adjusting operation of a train are disclosed. A method may include: receiving one or more infrared images of a brake line of the train; detecting one or more leaks of the brake line based on the one or more infrared images; and adjusting a brake command based on the detected one or more leaks.

20 Claims, 3 Drawing Sheets

SYSTEMS AND METHODS FOR ADJUSTING TRAIN OPERATION

TECHNICAL FIELD

The present disclosure relates generally to braking systems on trains, and more particularly, to systems and methods for adjusting train operation.

BACKGROUND

Rail vehicles, such as trains, may be powered by one or more locomotives and may include a number of interconnected cars. Trains may include a train braking system to slow or stop the train. The braking system may utilize pressurized air supplied through a brake line to apply and/or release brakes of the train. In some instances, the brake line may develop one or more leaks and the air pressure in the brake line may be reduced. Therefore, leaks in the brake line may reduce the ability of the braking system to effectively slow or stop the train. Thus, it is important to detect leaks in the brake line. However, current systems for detecting leaks in the brake line may be slow and/or may not be able to accurately detect severity and locations of the leaks. Further, current braking systems may not properly compensate for detected leaks.

U.S. Pat. No. 8,140,520, issued to Mian et al. on Mar. 20, 2012 ("the '250 patent"), describes a system for identification, processing, and routing of rail vehicles. The system of the '250 patent can collect measurement data of a rail vehicle by a measurement module, such as a camera. The measurement module may evaluate brake components or brake leakage by identifying anomalies in infrared data. However, the system of the '250 patent may not accurately detect locations of the leaks and/or may not properly compensate for detected leaks in the brake line.

The systems and methods of the present disclosure may address or solve one or more of the problems set forth above and/or other problems in the art. The scope of the current disclosure, however, is defined by the attached claims, and not by the ability to solve any specific problem.

SUMMARY

In one aspect, a method for adjusting operation of a train is disclosed. The method may include: receiving one or more infrared images of a brake line of the train; detecting one or more leaks of the brake line based on the one or more infrared images; and adjusting a brake command based on the detected one or more leaks.

In another aspect, a system for adjusting operation of a train is disclosed. The system may include: a brake line for controlling one or more brakes of the train; one or more infrared cameras for capturing one or more infrared images of the brake line; and a controller. The controller may be configured to: receive the one or more infrared images of the brake line; detect one or more leaks of the brake line based on the one or more infrared images; and adjust a brake command based on the detected one or more leaks.

In yet another aspect, a method for adjusting operation of a train is disclosed. The method may include: receiving one or more infrared images of a brake line of the train; detecting one or more leaks of the brake line based on the one or more infrared images; determining a severity of the one or more leaks based on a temperature differential in the one or more infrared images; and adjusting a brake command based on the severity of the one or more leaks.

BRIEF DESCRIPTION OF THE DRAWINGS

The accompanying drawings, which are incorporated in and constitute a part of this specification, illustrate various exemplary embodiments and together with the description, serve to explain the principles of the disclosure.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Further, relative terms, such as, for example, "about," "substantially," "generally," and "approximately" are used to indicate a possible variation of ±10% in a stated value.

Figure 1:
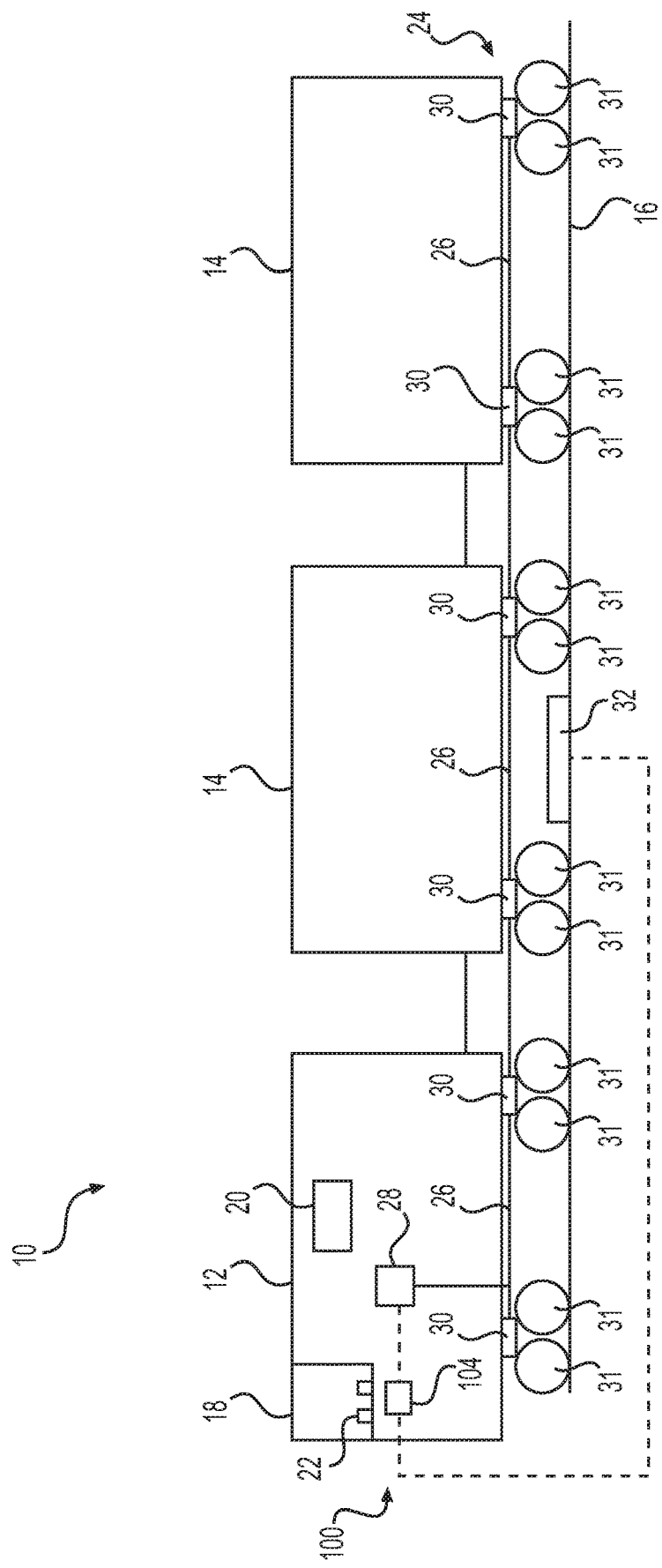
FIG. 1 illustrates a schematic side view of an exemplary train including a brake leak detection system, according to aspects of the disclosure.

FIG. 1 illustrates a schematic side view of a train 10 including a brake leak detection system 100, according to aspects of the disclosure. The train 10 may include a locomotive 12 that may pull and/or push a variety of cars 14 along rails 16. The locomotive 12 may include an operator cab 18 and an engine 20 to power the locomotive in order to propel the cars 14 along rails 16. Engine 20 may include one or more engines, turbines, electric motors, electromagnetic systems, or any other type of power source known in the art. A fuel or energy source may be carried aboard the train 14 in the form of fuel and/or battery power, or may be positioned along the rails 16, such as by an additional power source rail (e.g., a third rail). Operator cab 18 may include a control interface 22 that may provide notifications and control aspects of train 10. Control interface 22 may include buttons, levers, computer interfaces, and/or any other type of interface for providing notifications and controlling train 10. Accordingly, an operator in cab 18 may receive notifications and control train 10 using control interface 22. It is understood that train 10 may also be operated remotely (e.g., by an offboard operator) and/or may be operated automatically (e.g., without operator intervention), as detailed further below. Further, while a single locomotive 12 and two cars 14 are illustrated in FIG. 1, it is understood that train 10 may consist of any number of locomotives 12 and/or cars 14 connected and positioned in any configuration, as necessary.

Train 10 may further include a braking system 24. Braking system 24 may include a brake line 26 (e.g., formed by pipes and/or hoses), which may pass beneath and between locomotive 12 and cars 14 of train 10. Brake line 26 may contain pressurized air, or another fluid, which may be pressurized by a compressor 28. Brakes 30 may be used to slow rotation of one or more wheels 31 of the locomotive 12 and cars 14 in order to slow the speed of train 10. For example, brakes 30 may include a brake shoe (not shown) that is applied against the wheels 31 by a brake cylinder (not shown). Each locomotive 12 and/or car 14 of train 10 may include an air reservoir (not shown) for storing pressurized air from brake line 26 and providing the pressurized air to the brake cylinder to push the brake shoes against the wheels in order to apply the brakes 30 in response to a brake command 108 (FIG. 2), as detailed further below. Brakes 30 may be located on locomotive 12 and/or any number of cars 14.

Brakes 30 may be applied and/or released manually by an operator (e.g., onboard and/or remotely) as desired, and/or may be applied and released automatically (e.g., automatically by controller 104). In the exemplary embodiment, brakes 30 may be set to an applied position by default and may be released and/or applied in response to a change in pressure in brake line 26. For example, a connection (e.g., a valve) between the compressor 28 and brake line 26 may be controlled (e.g., via an operator and/or automatically) to increase and/or decrease the pressure in brake line 26. Brakes 30 may be released in response to an increase in pressure in brake line 26 and may be applied in response to a reduction in pressure in brake line 26. A triple valve (not shown) of brakes 30 may be actuated in response to the reduction in pressure in the brake line 26 in order to supply the pressurized air from the reservoir to the brake cylinder to apply the brakes. For example, when the pressure in brake line 26 reduces below the pressure in the reservoir, the triple valve may be actuated such that the reservoir is connected to the brake cylinder and the brakes 30 may be applied in proportion to the amount of pressure reduction. Conversely, when the pressure in the brake line 26 is greater than the pressure in the reservoir, the triple valve may be actuated such that the reservoir is disconnected from the brake cylinder and the brakes 30 may be released (e.g., the brake shoe may be released from, or become free from contact with, the wheel).

Brake leak detection system 100 may include an infrared camera 32 in communication with a controller 104. Infrared camera 32 may communicate with controller 104, for example, through wireless communication (e.g., satellite, cellular, radio frequency, Bluetooth, WiFi, near-field communication, or the like), wired communication (e.g., Ethernet or the like) via a ground station and/or communication lines along rails 16 (e.g., above ground and/or below ground), and/or by any other communication means. Infrared camera 32 may communicate with controller 104 through a network, such as the Internet, a local area network (LAN), a controller area network (CAN), or the like. Infrared camera 32 may include any type of camera for capturing, or creating, one or more images using infrared radiation. For example, infrared camera 32 may include a thermographic camera that senses and creates an image of electromagnetic radiation. Infrared camera 32 may create images of electromagnetic radiation having a wavelength greater than a red end of the visible light spectrum, such as wavelengths between about 1,000 nm and about 14,000 nm. Infrared camera 32 may capture one or more infrared images of brake line 26.

In the exemplary embodiment, infrared camera 32 may be a stationary unit positioned between rails 16 and aimed in an upward direction at brake line 26. Accordingly, infrared camera 32 may capture images of brake line 26 as train 10 moves past infrared camera 32. While this disclosure will discuss infrared camera 32 as a stationary camera, it is understood that in an alternative embodiment, infrared camera 32 may be a mobile unit that may be moved along, or within, the rails 16. Infrared camera 32 may also be positioned, stationary and/or mobile (e.g., in a rolling unit), along a side of train 10. While only a single infrared camera 32 is depicted in FIG. 1, it is understood that brake leak detection system 100 may include any number of infrared cameras 32 that may be positioned and configured as stationary units and/or mobile units. Controller 104 may detect leaks in the brake line 26 based on the infrared images and control aspects of train 10 in response to the detected leaks, as detailed further below.

Figure 2:
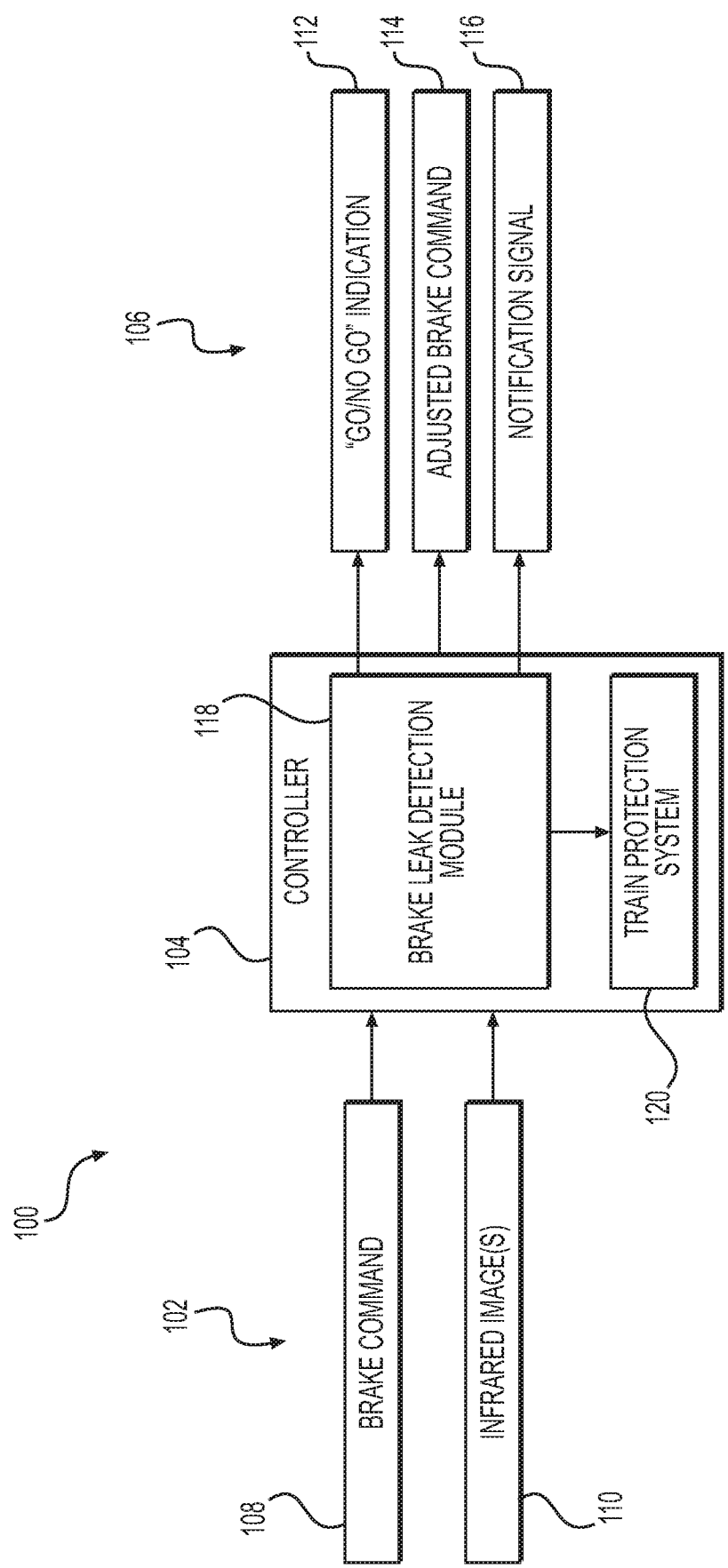
FIG. 2 illustrates a schematic view of the brake leak detection system of FIG. 1.

FIG. 2 illustrates a schematic view of the brake leak detection system 100 for notification, operation, and/or control of at least portions of train 10. Control system 100 may include inputs 102, controller 104, and outputs 106. Inputs 102 may include a brake command 108 and the one or more infrared images 110 from infrared camera 32. Output 106 may include, for example, a "go/no go" indication signal 112, an adjusted brake command 114 and/or a notification signal 116.

Controller 104 may embody a single microprocessor or multiple microprocessors that may include means for adjusting operation of a train 10. For example, controller 104 may include a memory (e.g., a non-volatile memory), a secondary storage device, a processor, such as a central processing unit or any other means for accomplishing a task consistent with the present disclosure. The memory or secondary storage device associated with controller 104 may store data and/or software routines that may assist controller 104 in performing its functions. Further, the memory or secondary storage device associated with controller 104 may also store data received from the various inputs 102 associated with brake leak detection system 100. Numerous commercially available microprocessors can be configured to perform the functions of controller 104. It should be appreciated that controller 104 could readily embody a general machine controller capable of controlling numerous other train functions. Various other known circuits may be associated with controller 104, including signal-conditioning circuitry, communication circuitry, hydraulic or other actuation circuitry, and other appropriate circuitry.

Brake command 108 may be received from an operator (e.g., via interface 22), from a module of controller 104, and/or from a train protection system 120, as detailed below. Brake command 108 may cause brakes 30 to be applied and/or released. For example, brake command 108 may control, or vary, the pressure in brake line 26, as detailed above. Brake command 108 may include when, and with how much pressure, the brakes 30 are to be applied and/or released for a given speed of train 10. In some embodiments, brake command 108 may include a braking curve that plots a nominal braking profile for a required braking distance versus a given speed of train 10. For example, the braking profile may include a curve formed on the plot of braking distance versus speed as train 10 slows down when the brakes 10 are applied.

Infrared images input 110 may include the one or more infrared images captured by infrared camera 32. As used herein, infrared images may include still images, video images (e.g., frames of a video), or the like. As detailed above, the infrared images input 110 may include infrared images of brake line 26. For example, controller 104 may receive infrared images input 110 from infrared camera 32 as train 10 moves past infrared camera 32 and/or as infrared camera 32 is moved along train 10. The infrared images may include images of electromagnetic radiation captured in the images. Thus, the infrared images may indicate temperatures and/or a thermal signature in the captured images.

For outputs 106, controller 104 may use the infrared images 110 to detect leaks in brake line 26 and output a "go/no go" indication 112, an adjusted brake command 114, and/or a notification signal 114 based on the detected leaks, as detailed further below. The "go/no go" indication 112 may include indicating whether train 10 may depart from, for example, a railyard, a train station, or the like. For example, a "go" indication may indicate that train 10 may depart and a "no go" indication may indicate that train 10 may not depart. Adjusted brake command 114 may include adjusting brake command 108 in response to detected leaks in brake line 26, such as when the brakes 30 are applied, as detailed further below. Notification signal 116 may include sending a notification to a train operator, to maintenance personnel, and/or to a train protection system 120 to indicate the detected leaks and/or the adjusted brake command 114, as detailed further below.

Controller 104 may also include a brake leak detection module 118 and train protection system 120. Brake leak detection module 118 may receive inputs 102, implement a method 300 for adjusting operation of train 10 and control outputs 106, as described with reference to FIG. 3 below. Train protection system 120 may include functions and/or logic of controller 104 for ensuring safe operation of train 10. One such function of train protection system 120 may include an automatic function for checking and ensuring a speed of train 10 is compatible with a permitted speed allowed (e.g., a speed limit). For example, train protection system 120 may automatically activate, or apply, brakes 30 to slow the speed of train 10 if train 10 exceeds a speed limit. In some instances, if train 10 exceeds the speed limit a predetermined number of times and/or by a predetermined threshold, train protection system 120 may apply an emergency brake of train 10. Thus, train protection system 120 may receive a signal (e.g., notification signal 114) from brake leak detection module 118 and control outputs 106, such as automatically adjusting the brake command 108 to output an adjusted brake command 114, as detailed below.

While controller 104 is depicted onboard train 10 in FIG. 1, it is understood that controller 104 and/or aspects of controller 104 may be located offboard, or remote from, train 10. Further, brake leak detection system 100 may include multiple controllers 104 for controlling aspects of train 10, such as method 300 described below with reference to FIG. 3. For example, aspects of brake leak detection module 118 and/or train protection system 120 may be located and executed in one or more separate controllers (e.g., onboard and/or offboard train 10).

INDUSTRIAL APPLICABILITY

The disclosed aspects brake leak detection system 100 of the present disclosure may be used for any type of train 10, including freight trains, passenger trains, or the like, to assist in controlling the train 10.

As used herein, the terms automated and automatic are used to describe functions that are done without user intervention. Thus, various steps of method 300, described below, may proceed without user intervention.

Figure 3:
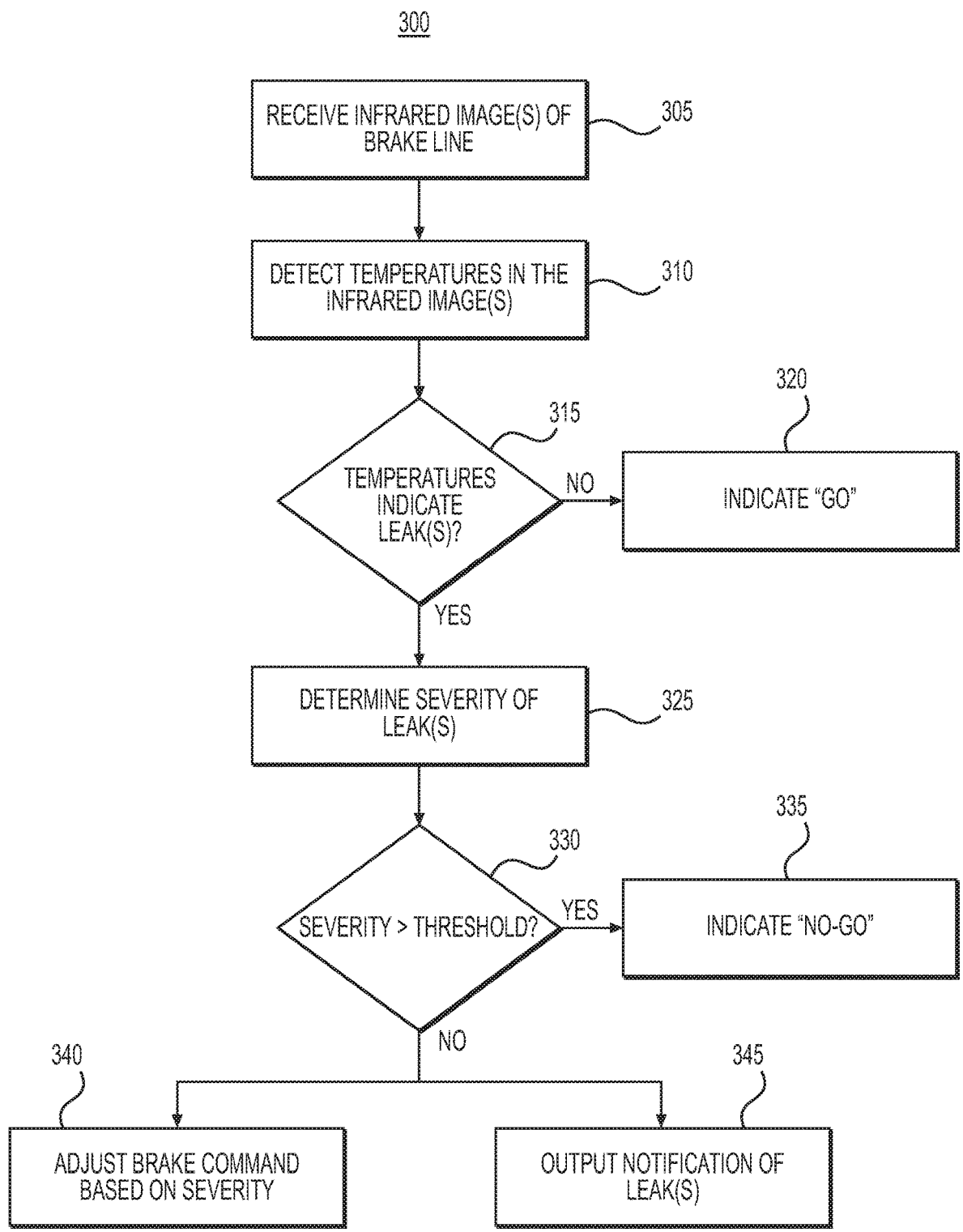
FIG. 3 provides a flowchart depicting a method for adjusting train operation using the brake leak detection system of FIGS. 1 and 2.

FIG. 3 illustrates a flowchart depicting an exemplary method 300 for adjusting operation of train 10. In the exemplary embodiment, method 300 may be performed prior to train 10 departing (e.g., while train 10 is stationary and/or initially begins to move). For example, method 300 may be performed while train 10 is in a railyard, a train station, or the like. In an initial step 305, controller 104 may receive one or more infrared images of brake line 26. For example, brake leak detection module 118 may receive infrared images input 110 from infrared camera 32 as train 10 moves past infrared camera 32 and/or as infrared camera 32 is moved along train 10. In step 310, controller 104 may determine a thermal signature and/or temperatures in the infrared images, as known in the art. For example, module 118 may process the images to determine temperatures in the infrared images and/or other characteristics of the thermal signature. For example, brake leak detection module 118 may determine temperatures in the infrared images based on the electromagnetic radiation captured in the images. In step 315, controller 104 may determine whether the temperatures indicate one or more leaks. For example, module 118 may determine whether a temperature differential (e.g., a saturation) in the images indicate leaks in brake line 26. If there are leaks in brake line 26, the temperature differential may indicate locations in the brake line 26 that have greater temperatures than expected (e.g., greater than a predetermined threshold). Module 118 may also determine leaks in the infrared images based on other characteristics of the thermal signature.

In step 320, if the temperatures in the images do not indicate one or more leaks (step 315: NO) while train 10 is at the railyard or train station, controller 104 may output a "go" indication to enable train 10 to depart. In step 325, if the temperatures in the images indicate one or more leaks (step 315: YES), controller 104 may determine a severity of the one or more leaks. For example, module 118 may determine a leak rate and/or a number of leaks in brake line 26. The leak rate may include a volume of air being leaked from brake line 26 over time (e.g., cubic feet per minute) that indicates a velocity of the air flowing from brake line 26. The number of leaks may include a total number and location of leaks in brake line 26. Module 118 may determine the severity (e.g., leak rate) of the leaks based on a temperature differential between two or more images and/or based on other characteristics of the thermal signature of the leaks in the infrared images. Thus, module 118 may utilize image processing techniques to detect one or more leaks in the infrared images and to determine a severity of a leak based on the infrared images.

In step 330, controller 104 may determine if the severity of the one or more leaks is greater than (e.g., exceeds) a threshold. The threshold may include a predetermined leak rate and/or number of leaks. The threshold may be stored in the memory of controller 104. In one example, the threshold may include 4 cubic feet per minute (CFM). However, it is understood the threshold may include any predetermined leak rate. In step 335, if the severity exceeds the threshold (step 330: YES), controller 104 (e.g., module 118) may output a "no go" indication to prevent train 10 from departing.

In step 340, if the severity does not exceed the threshold (step 330: NO), controller 104 may adjust any current or future brake commands 108 based on the severity of the leaks and output the adjusted brake command 114. For example, module 118 may adjust the brake command 108 in proportion to the severity (e.g., leak rate and/or number) of the one or more leaks in brake line 26. The adjusted brake command 114 may include adjusting when the brakes are applied and/or adjusting when the brakes will be applied for a given speed of train 10 based on the severity. For example, leaks in brake line 26 may affect the reduction in pressure in brake line 26 in order to activate, or apply, brakes 30. Thus, the adjusted brake command 114 may adjust when the pressure reduction begins and/or adjust an amount of pressure reduction in brake line 26 for a desired braking action of brakes 30. It is understood that the adjusting the brake command 108 (step 340) may be performed manually and/or automatically. For example, module 118 may notify an operator of train 10 of the adjusted brake command 114 and the operator may manually apply the brakes 30 based on the adjusted brake command 114. Further, module 118 may automatically apply the brakes 30 based on the adjusted brake command 114 and/or notify train protection system 120 of the adjusted brake command 114 and train protection system 120 may automatically apply brakes 30 accordingly, as detailed below.

Additionally, or alternatively, in step 345, if the severity does not exceed the threshold (step 330: NO), controller 104 may output notification signal 116 of the one or more leaks. For example, controller 104 may notify an operator of train 10, remote (e.g., offboard) personnel, maintenance personnel, and/or the train protection system 120 of the one or more leaks and/or of the adjusted brake command 114. The notification signal 116 may include the severity of the one or more leaks, locations of the one or more leaks, and/or the number of leaks. The location of the one or more leaks may include a location along brake line 26 including an indication of a locomotive 12 and/or a car 14 at which the one or more leaks are located. Thus, the operator of the train 10 may receive the adjusted brake command 114 and apply the brakes 30 accordingly. Further, maintenance personnel may receive the number and location of the leaks in order to quickly find and repair the leaks. Train protection system 120 may receive the notification signal 116 from module 118 and automatically adjust the brake command 108 to output an adjusted brake command 114 to apply brakes 30, similarly as described above. After the brake command 108 has been adjusted (step 340) and/or after the output of notification signal 116 (step 345), controller 104 may output a "go" indication to enable train 10 to depart.

In some embodiments, controller 104 may output notification signal 116 after a "no go" indication (step 335). For example, module 118 may output the severity and locations of the one or more leaks to maintenance personnel to enable the maintenance personnel to quickly fix and/or repair the leaks.

Method 300 may be performed while train 10 is stationary, as detailed above, and/or may be performed while train 10 is moving along rails 16. Further, method 300 and/or aspects of method 300 be performed after train 10 has departed, for example, while train 10 is in transit (e.g., mid-trip), and/or as train 10 is arriving and/or stopping at the railyard, train station, or the like.

Brake leak detection system 100 may enable more accurate detection of leaks in brake line 26. For example, infrared images may provide a more accurate depiction of a severity and location of the leaks. Therefore, brake leak detection system 100 may enable maintenance personnel to know locations and severity of any leaks to more quickly fix and repair the leaks.

Further, brake leak detection system 100 may compensate for detected leaks in brake line 26. For example, brake leak detection system 100 may automatically adjust the brake command 108 based on the one or more leaks in order to effectively and safely stop train 10 (e.g., via an operator of train 10 and/or via train protection system 120) when there are leaks in brake line 10. Therefore, brake leak detection system 100 may compensate for less pressure than expected in brake line 26 and adjust the brake command 108 (e.g., manual and/or automatic) accordingly and/or may prevent train 10 from departing. Thus, brake leak detection system 100 may provide for improved safety and control of train 10.

It will be apparent to those skilled in the art that various modifications and variations can be made to the disclosed system without departing from the scope of the disclosure. Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for adjusting operation of a train, comprising:
   receiving one or more infrared images of a brake line of the train;
   detecting one or more leaks of the brake line based on the one or more infrared images; and
   adjusting a brake command based on the detected one or more leaks.

2. The method of claim 1, further including determining a severity of the one or more leaks based on a temperature differential in the one or more infrared images.

3. The method of claim 2, further including determining a location of the one or more leaks based on the one or more infrared images.

4. The method of claim 3, further including notifying maintenance personnel of a severity and the location of the one or more leaks.

5. The method of claim 1, wherein prior to automatically adjusting the brake command, the method further includes determining whether the one or more leaks exceeds a threshold;
   if the one or more leaks exceeds the threshold, preventing the train from departing; and
   if the one or more leaks does not exceed the threshold, automatically adjusting the brake command based on the detected one or more leaks.

6. The method of claim 1, wherein the adjusting of the brake command includes adjusting when the brakes are applied based on a severity of the one or more leaks.

7. The method of claim 1, wherein the adjusting of the brake command includes adjusting when the brakes will be applied for a given speed.

8. The method of claim 1, wherein the adjusting of the brake command includes notifying an onboard train protection system of a severity of the one or more leaks and automatically adjusting when the brakes are applied to prevent the train from exceeding a speed limit.

9. A system for adjusting operation of a train, comprising:
   a brake line for controlling one or more brakes of the train;
   one or more infrared cameras for capturing one or more infrared images of the brake line; and;
   a controller configured to:
     receive the one or more infrared images of the brake line;
     detect one or more leaks of the brake line based on the one or more infrared images; and
     adjust a brake command based on the detected one or more leaks.

10. The system of claim 9, wherein at least one of the one or more infrared cameras is located in a stationary unit.

11. The system of claim 9, wherein the controller is located on the train.

12. The system of claim 9, further including determining a severity of the one or more leaks based on a temperature differential in the one or more infrared images.

13. The system of claim 9, wherein the controller is further configured to determine a location of the one or more leaks based on the one or more infrared images.

14. The system of claim 9, wherein prior to adjusting the brake command, the controller is further configured to:
   determine whether the one or more leaks exceeds a threshold;
   if the one or more leaks exceeds the threshold, prevent the train from departing; and
   if the one or more leaks does not exceed the threshold, adjust the brake command based on the detected one or more leaks.

15. The system of claim 9, wherein the adjusting the brake command includes adjusting when the brakes are applied based on a severity of the one or more leaks.

16. The system of claim 9, wherein the adjusting the brake command includes adjusting when the brakes will be applied for a given speed.

17. A method for adjusting operation of a train, comprising:
   receiving one or more infrared images of a brake line of the train;
   detecting one or more leaks of the brake line based on the one or more infrared images;
   determining a severity of the one or more leaks based on a temperature differential in the one or more infrared images; and
   adjusting a brake command based on the severity of the one or more leaks.

18. The method of claim 17, further including determining a location of the one or more leaks based on the one or more infrared images.

19. The method of claim 17, wherein prior to adjusting the brake command, the method further includes determining whether the one or more leaks exceeds a threshold;
   if the one or more leaks exceeds the threshold, preventing the train from departing; and
   if the one or more leaks does not exceed the threshold, adjusting the brake command based on the severity of the one or more leaks.

20. The method of claim 17, wherein the adjusting the brake command includes notifying an onboard train protection system of a severity of the one or more leaks and automatically adjusting when the brakes are applied to prevent the train from exceeding a speed limit.

\* \* \* \* \*